United States Patent [19]
Scruggs

[11] Patent Number: 5,361,475
[45] Date of Patent: Nov. 8, 1994

[54] SAFETY CABLE TOOL

[75] Inventor: Michael G. Scruggs, Orlando, Fla.

[73] Assignee: Daniels Manufacturing Corporation, Orlando, Fla.

[21] Appl. No.: 945,095

[22] Filed: Sep. 5, 1992

Related U.S. Application Data

[63] Continuation-in-part of Ser. No. 831,186, Feb. 5, 1992, Pat. No. 5,230,129.

[51] Int. Cl.5 .............................................. B23P 19/00
[52] U.S. Cl. ...................................... 29/267; 29/282; 140/123.6
[58] Field of Search ............... 140/123.5, 123.6, 93.4, 140/152, 150; 29/243.56, 267, 282

[56] References Cited

U.S. PATENT DOCUMENTS

| | | | |
|---|---|---|---|
| 3,169,560 | 2/1965 | Caveney et al. | 140/123.6 |
| 3,526,187 | 4/1970 | Gilliard | 140/93.4 |
| 3,661,187 | 5/1972 | Caveney et al. | 140/123.6 |
| 3,670,782 | 6/1972 | Kabel | 140/123.6 |
| 4,718,460 | 1/1988 | Sato | 140/123.6 |
| 4,934,416 | 6/1990 | Tunkiss | 140/123.6 |
| 5,123,456 | 6/1992 | Jansen | 140/123.6 |
| 5,230,129 | 7/1993 | Scruggs | 29/267 |

*Primary Examiner*—Lowell A. Larson
*Attorney, Agent, or Firm*—James H. Beusse

[57] ABSTRACT

A tool for tensioning safety cable to a predetermined tension limit and for automatically terminating the cable when the predetermined limit is reached. The tool comprises a rotatable wheel mounted for reciprocating rotation about a point on the tool for incrementally advancing the cable during a drive stroke and a toggle assembly operatively connected to the rotatable wheel for affecting its reciprocal rotating motion. A tension setting mechanism operatively coupled to the toggle assembly for inhibiting rotation of the rotatable wheel when tension on the cable is greater than a preselected value. A clamp is operative in response to inhibited rotation of the rotatable wheel for terminating the cable by crimping a ferrule to the cable while simultaneously severing a free end of the cable.

10 Claims, 7 Drawing Sheets

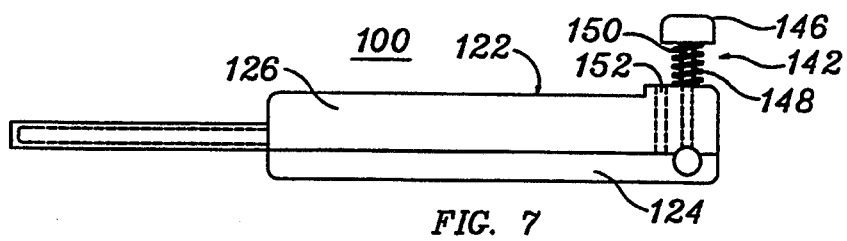
FIG. 7
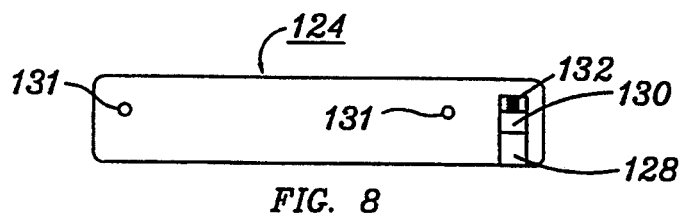
FIG. 8
FIG. 8A
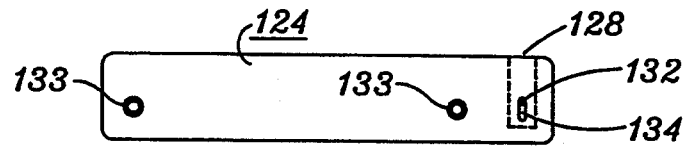
FIG. 9
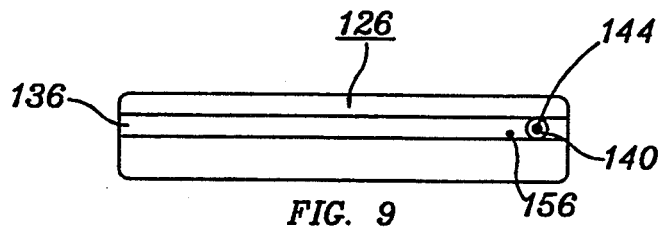
FIG. 10
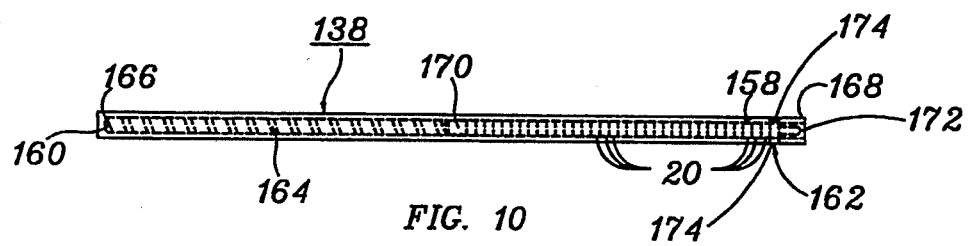
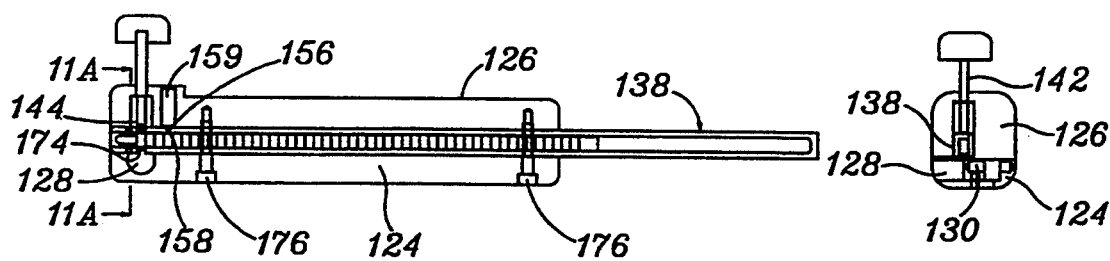
FIG. 11
FIG. 11A

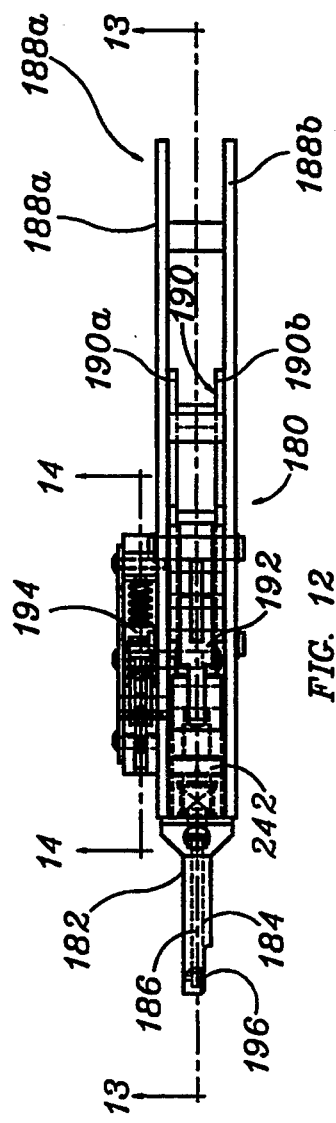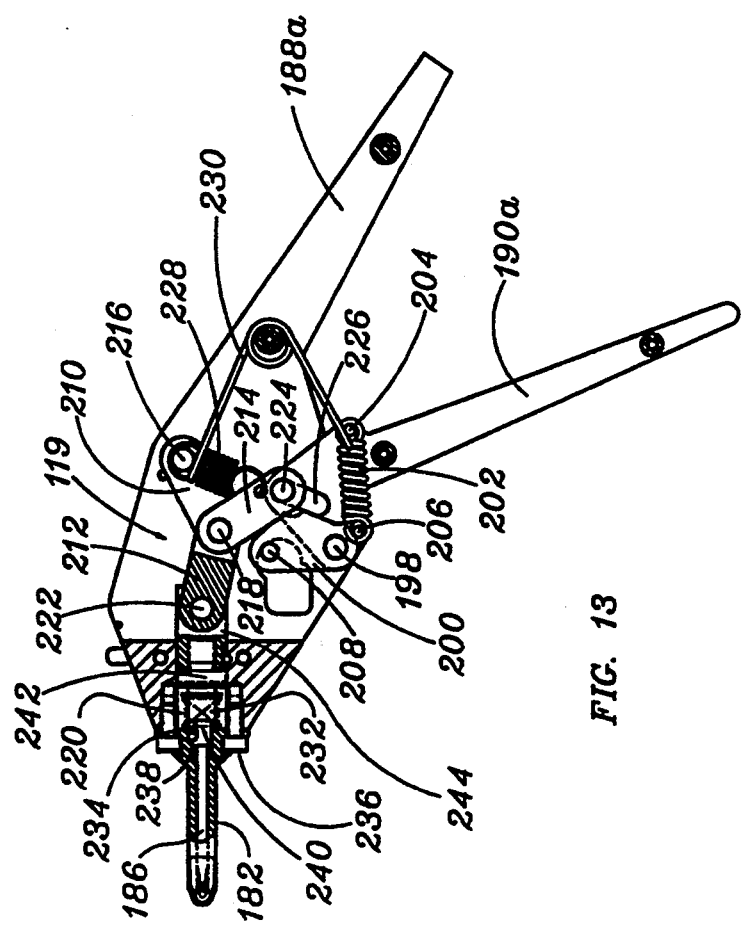

SAFETY CABLE TOOL

This is a continuation-in-part of application Ser. No. 07/831,186, filed Feb. 5, 1992, now U.S. Pat. No. 5,230,129 granted Jul. 27, 1993.

The present invention relates to apparatus for attaching safety cables to releasable fasteners and, more particularly, to apparatus for tensioning, locking and terminating safety cables.

BACKGROUND OF THE INVENTION

Various types of machinery are subject to vibration which can loosen nuts and bolts. Safety wire has long been used as protection to resist such loosening. In such use, safety wire secures two or more parts together so that loosening of one part is counteracted by tightening of the wire. Typically, a single wire is passed through an aperture in a nut or bolt, the free ends twisted together up to another part, one of the ends inserted through an aperture in the another part and the ends again twisted. The standards for utilization of safety wire are critical and are set forth in Aerospace Standard AS567, entitled "General Practices for the Use of Lockwire, Key Washers and Cotter Pins," available from the Society of Automotive Engineers, Inc., 400 Commonwealth Dr., Warrendale, Pa.

Safety wire or lockwire, as it is sometimes known, has several known problems. More recently, there has been developed an improved locking system using safety cable. Safety cable is a stranded cable having a termination on one end allowing the cable to be pulled to a predetermined tension through the aforementioned apertures in nuts and bolts. After tensioning, the free end of the cable must be terminated to hold the tension and cleanly severed to minimize any possibility of snags on loose wires. Accordingly, it is desirable to provide a tool which simultaneously crimps a ferrule onto the cable and severs the free end of the cable while establishing a predetermined tension in the cable.

SUMMARY OF THE INVENTION

A tool for tensioning safety cable to a predetermined tension limit and for automatically terminating the cable when the cable has been tensioned to the predetermined limit includes means for grasping and pulling the cable to the predetermined tension limit and means for automatically crimping a ferrule onto the cable when the predetermined tension limit is reached. The crimping means is also operative to sever a free end of the cable concurrently with crimping of the ferrule. More particularly, the tool comprises a rotatable wheel mounted to the tool for incrementally winding the cable about at least a portion of the wheel during a drive stroke and a toggle assembly operatively connected to the rotatable wheel for affecting reciprocal rotation thereof. Tension setting means is operatively coupled to the toggle assembly for inhibiting rotation of the wheel when cable tension is greater than a preselected value. The tool also includes clamping means operative in response to inhibited advancement of the cable for terminating the cable. The clamping means may be a ferrule held in the tool and a plunger assembly operative to compress the ferrule when the preselected tension is reached. In one form, the plunger assembly pushes the ferrule in a shearing action adjacent an aperture through which the cable extends so as to simultaneously shear the cable.

BRIEF DESCRIPTION OF THE DRAWINGS

For a better understanding of the present invention, reference may be had to the following detailed description taken in conjunction with the accompanying drawings in which:

FIG. 7 is a planar view of a ferrule loading tool;

FIGS. 8 and 8A are top and bottom views, respectively, of the lower section of the tool of FIG. 7;

FIG. 9 is a bottom view of the upper section of the tool of FIG. 7;

FIG. 10 is an illustration of a ferrule holding cartridge for the tool of FIG. 7;

FIGS. 11 and 11A are cross-sectional views taken longitudinally and laterally, respectively, through the tool of FIG. 7.

FIG. 12 is a top plan view of a tool in accordance with one embodiment of the present invention;

FIG. 13 is a cross-sectional view of the tool of FIG. 12 taken along the line 13—13;

DETAILED DESCRIPTION

Figure 1:
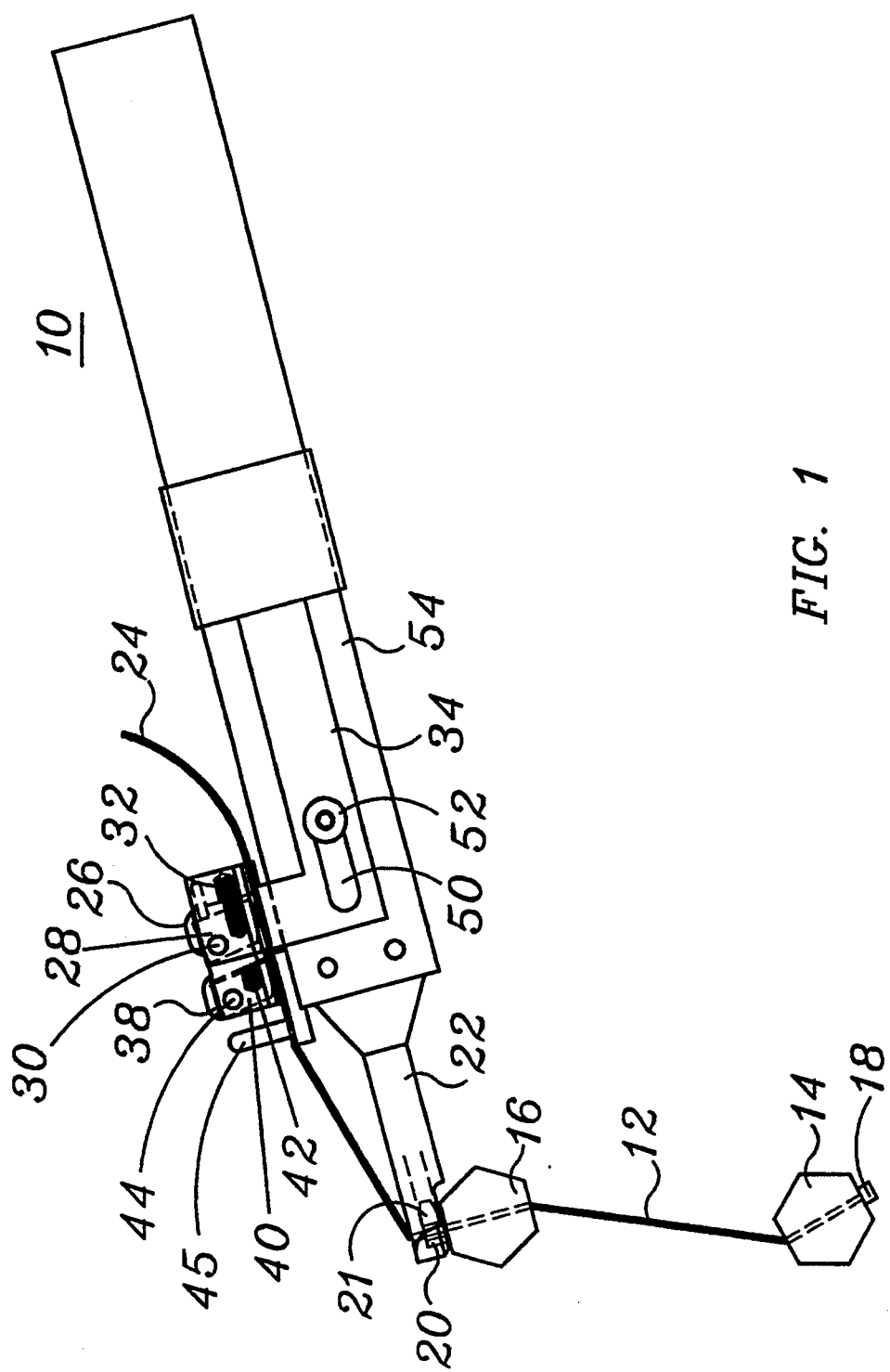
FIG. 1 is a top planar new of a tool according to the present invention.
Figure 2:
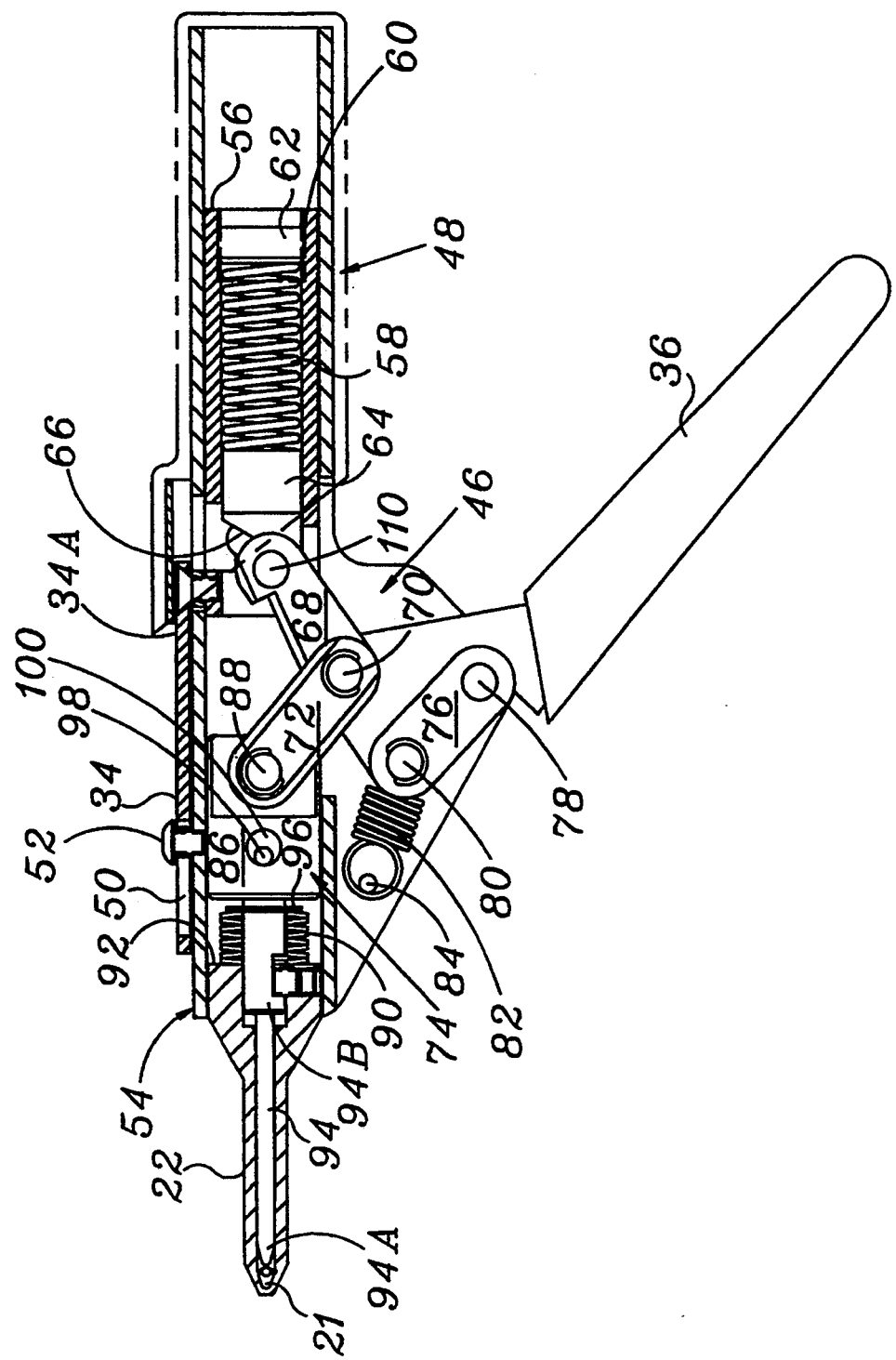
FIG. 2 is a cross-sectional side view of the tool of FIG. 1.

Referring to the Figures in generally and in particular to FIGS. 1 and 2, there is illustrated a top view and a cross-sectional side view of a safety cable tool 10. FIG. 1 includes a safety cable 12 passing through apertures in each of the bolt heads 14 and 16. A ferrule 18 is clamped at one end of cable 12 to prevent it from being pulled through the bolt apertures. A second ferrule 20 is seated in an aperture 21 in the nosepiece 22 of tool 10 in a position to be crimped onto cable 12 when a predetermined tension has been pulled on cable 12 by tool 10. The free end 24 of cable 12 is coupled to a shuttle assembly which includes a first clamping means 26 for grasping and pulling the cable end 24 in a direction to tension the cable. To this end, the means 26 includes a spring loaded, pivotable pawl 28 operable about a pin 30 to grasp the cable when the means 26 pulls the cable. A spring 32 urges the pawl 28 in a direction to grasp the cable. The means 26 is connected to a reciprocal arm 34 which pulls the means 26 in a direction to tension cable 12 when lever 36 (FIG. 2) is depressed.

When lever 36 is released, the arm 34 moves toward a second clamping means 38. During this latter movement, the pawl 28 pivots about pin 30 to release cable 12 and allow the means 26 to move without moving cable 12. The second clamping means 38 is fixed to tool 10 and includes a spring loaded, pivotable pawl 40 which grasps cable 12 and prevents the cable from moving in a direction to release tension on the cable when means 26 is released. A spring 42 urges pawl 40 about a pin 44 in a direction to tighten on cable 12. Both means 26 and means 38 are substantially identical and allow cable 12 to be pulled only in a direction to increase tension in the cable. A post 45 provides a fulcrum for supporting cable end 24 to facilitate pulling into clamping means 26 and 38.

The tool 10 includes a toggle assembly and a tension setting means indicated generally at 46 and 48, respectively, which cooperate to advance cable 12 through the shuttle assembly until the predetermined tension has been pulled on cable 12. The reciprocal arm 34 includes a slot 50 through which a pin 52 passes in order to hold arm 34 in sliding engagement with a top outer surface of a first or tool housing 54. An end 34A of arm 34 is attached to a second or inner housing 56 slidingly positioned within an aft portion of tool housing 54.

The tension setting means 48 comprises a spring 58, which may be a coil spring, positioned within housing 56. At least a portion of housing 56 is threaded, as shown at 60, so that a threaded plug 62 can be inserted to form an adjustable seat for spring 58. The plug 62 can be positioned to vary the compression of spring 58 to control the tension to be pulled in cable 12. The end of spring 58 opposite plug 62 abuts against a push rod 64 having a forward facing inclined surface 66. The spring 58, plug 62 and rod 64 comprise, with inner housing 56, the tension setting means for controlling tension in cable 12. The arm 34 in combination with the housing 56 and tension setting means comprise an actuator means operable with the toggle assembly to pull tension on the cable 12 when the tension is less than the predetermined limit set by spring 58 and plug 62.

The lever 36 is coupled to inner housing 56 via toggle assembly 46. The toggle assembly 46 comprises a first linkage 68 extending between a connecting pin 70 on lever 36 and inner housing 56. A second linkage 72 extends from the connecting pin 70 to a reciprocal plunger assembly 74. A third linkage 76 extends from a connecting pin 78 passing through tool housing 54 to a connecting pin 80 passing through lever 36. A spring 82 extends between pin 80 and a pin 84 passing housing 54. Spring 82 acts as a return spring to return lever 36 to its normal open position as shown in FIG. 2. Each of the linkages 68, 72 and 76 are pivotally mounted at their respective ends.

When lever 36 is depressed toward housing 54, the lever 36 rotates or pivots about pin 80, which pin 80 is pivotable about pin 78 through linkage 76. This action allows pin 70 to be moved in an upward trajectory between tension setting means 48 and plunger assembly 74. As pin 70 is forced upward, the linkages 68 and 72 become aligned forcing tension setting means 48 and plunger assembly 74 apart. If the tension in cable 12 is less than the predetermined limit, e.g., 15 psi, the inner housing 56 will move, pulling arm 34 and clamping means 36 in a direction to pull slack from cable 12. Conversely, if the tension in cable 12 reaches or exceeds the predetermined limit, the housing 56 will be locked in place and result in plunger assembly 74 being actuated.

The plunger assembly 74 includes a sliding block 86 which slides within a forward tubular portion of outer or tool housing 54. A pin 88 pivotally connects linkage 72 to block 86. A spring 90, such as a plurality of Belville washers, is positioned between block 86 and an inner end 92 of nosepiece 22. The spring constant of spring 90 is greater than that of spring 82 to prevent actuation of the plunger prior to a lock-up condition of inner housing 56. A plunger 94 having a tip end 94A and an enlarged base end 94B extends between block 86 and the aperture 21. The spring 90 is clamped to about 280 psi and held on base and 94B by a C-washer 96. A pin 98 extending through an aperture 100 and mating, but smaller, apertures in the outer housing 54 limits the extent of movement of block 86 and prevents the spring 90 from collapsing the toggle assembly towards tension setting means 48.

Figure 3:
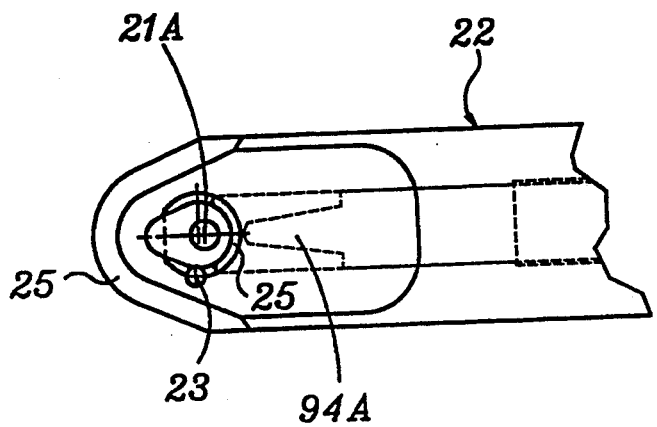
FIG. 3 is an enlarged view of the tip end of the nosepiece of the tool of FIG. 1.

As described above, a ferrule 20 fits within aperture 21 in the tip end of nosepiece 22. When the plunger assembly is actuated, the tip end 94A of plunger 94 is pushed into the aperture 21 thereby crimping the ferrule 20 about the cable 12. The aperture 21 is larger on an entrance side of the nosepiece than it is on the exit side. FIG. 3 is an enlarged view of the tip end of nosepiece 22 showing the entrance side having a large open area while the exit side has a small opening 21A just suitable for passage of cable 12. The entrance side opening has an oval configuration extending toward the tip end of nosepiece 22. Accordingly, as plunger 94 is actuated, it not only crimps ferrule 20 but drives the edge of the ferrule pass the exit side opening 21A. The ferrule edge and exit side opening edge combine to act as a shear to automatically sever the free end portion 24 of the cable 12 extending out of the ferrule 20. The tool 10 thereby pulls the cable 12 to the desired tension, crimps the ferrule and severs the free end of the cable in a single operation. An elastomer pin 23 fixed to one side of aperture 21 presses the ferrule 20 against the inner side of the aperture to prevent the ferrule from falling out of the tool if the tool is turned during operation. The areas indicated at 25 are chamfers, the chamfer surrounding aperture 21 being used to ease insertion of ferrule 20.

Figure 4:
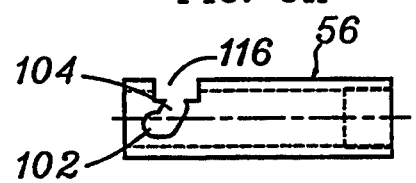
FIG. 4, is an elevation view of an inner housing of the tool of FIG. 1.
Figure 5:
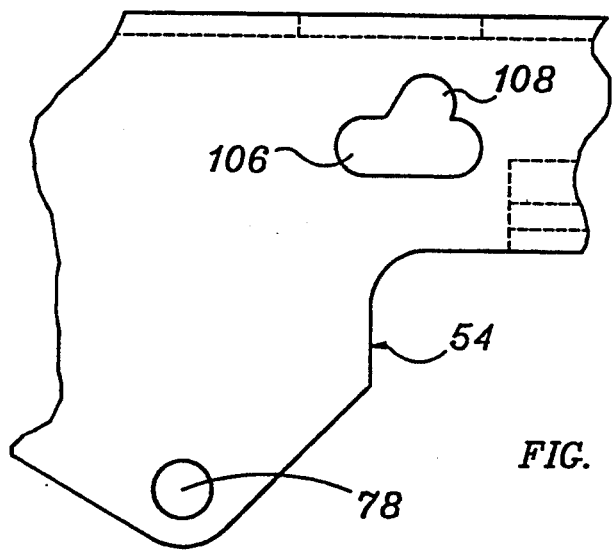
FIG. 5 is an enlarged, partial section of the tool of FIG. 1.

The mechanism for locking the inner housing 56 when the tension on cable 12 is at or greater than the predetermined limit can be appreciated by reference to FIGS. 4 and 5 in conjunction with FIG. 2. The inner housing 56 includes a first slot 102 extending lengthwise of the housing and a second slot 104 angular extending from the first slot. The outer tool housing 54 includes a first lengthwise slot 106 and a second angular slot 108 extending from slot 106. It will be appreciated that both housings 54 and 56 are tubular and that the slots extend through both sides of each housing. Furthermore, the slots 102 and 106 and the slots 104 and 108 are generally aligned. A pin 110 passes through tool 10 via slots 102, 106 and an aperture in linkage 68. Initially, the spring 82 acting through push rod 64 holds pin 110 in the forward end of the slot 102. As lever 36 is actuated, the linkage 68 pushes the pin 110 toward the aft end of the tool 10. Since the spring 82 holds the pin 110 in the forward end of slot 102, the effect is to drive the inner housing 56 backward carrying arm 34 and pulling tension on cable 12. When the tension on cable 12 reaches the predetermined limit, the spring 82 will begin to compress allowing pin 110 to move backwards in slot 102. The linkage 68 also instills an upward force on pin 110 and inclined surface 66 encourages pin 110 to move upward into slots 104 and 108. Since slots 108 are in the outer tool housing 54, the pin 110 is prevented from moving further and thereby locks inner housing 54 in place. With pin 110 fixed, upward movement of pin 70 drives the plunger assembly forward thus crimping the ferrule 20 and severing cable 12.

Figure 6A:
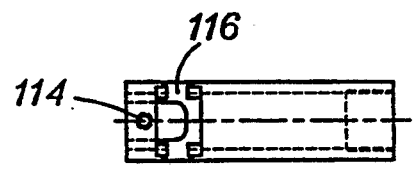
FIGS. 6A and 6B are top and bottom views, respectively, of the housing of FIG. 4.
Figure 6B:

FIGS. 6A and 6B illustrate top and bottom views, respectively, of the inner housing 56. The bottom includes a slot 112 for entry of the linkage 68. The top has a threaded aperture 114 for connection of arm 34. The top also includes a slot 116 which is needed to allow the linkage 68 to move vertically where pin 110 slips upward into slot 104. As shown in FIG. 2, the linkage 68 has a partial cutaway at its top edge to prevent interference with the top front portion of housing 56.

While the linkage 68, 72, and 76 have been shown as single links, it is preferable that each linkage comprise a pair of space links in order to reduce twisting torque at each connecting pin.

FIG. 7 is a planar view of a ferrule loading tool 120 for use with the safety cable tool 10. The loading tool is designed to dispense a single ferrule 20 and to seat it in the aperture 21 in tool 10 in one step. Further, the tool 120 inhibits dispensing of a ferrule 20 until the tool 10 is associated with the loading tool in a manner to seat ferrule 20 into the aperture 21.

Loading tool 120 includes a tool body 122 having a generally elongate shape with a generally rectangular cross-section. Tool body 122 is formed with a lower section 124 and an upper section 126.

FIG. 8 is a top plan view of lower section 124 showing a slot 128 extending transverse to the elongate direction of the tool body and partly therethrough. The slot 128 is shaped to fit the end of nosepiece 22 and cooperates with upper section 126 to assure that the nosepiece is inserted in the correct orientation for receiving a ferrule 20. A block 130 is slidingly positioned in slot 128 and biased toward the open end of the slot by a spring 132 reacting against a closed end of the slot. As will become apparent, the block 130 functions to prevent dispensing of a ferrule 20 unless a tool nosepiece 22 is positioned in the slot so as to push the block 130 towards the closed end of slot 128 and place aperture 21 in alignment for receiving a ferrule. As shown in the bottom view of section 124 in FIG. 8A, the block 130 includes an extension arm 132 which protrudes through a guide slot 134 aligned with slot 128. The arm 132 and slot 134 provide the dual functions of preventing block 130 from being pushed out slot 128 and allowing manual movement of block 130 in order to override the inhibit function of the block and allow manual dispensing of a ferrule 20. Holes 131 and countersunk regions 133 are passages for screws for joining sections 124 and 126.

Referring to FIG. 9, which is a bottom plan view of the upper section 126 of tool body 122, a slot 136 extends the full length of the tool body parallel to the elongate direction and transverse to slot 128. The slot 136 is sized and shaped to accept passage of a ferrule holding cartridge 138 (shown in FIG. 7). At one end of section 126, aligned with the slot 136 and with the slot 128 when the upper and lower sections 124, 126 are in their assembled condition, there is an aperture 140 for receiving an actuator 142 (see FIG. 7). The actuator 142 has an end 144 extending through aperture 140 in a position for engaging a ferrule 20 within cartridge 138. As seen in FIG. 7, actuator 142 has an upper portion extending above an upper surface of section 126 and terminating in an enlarged cap 146. A spring 148 is positioned about a shaft 150 of actuator 142 and reacts between cap 146 and section 126 to bias the actuator upward such that end 144 is normally out of the slot 136 and retracted within aperture 140.

A second aperture 152 also extends through upper section 126 aligned with slot 136 and adjacent aperture 140. A spring loaded detent mechanism 154 is positioned in aperture 152 with an end 156 extending into slot 136. The detent end 156 is radiused to facilitate its slipping into a groove 158 (see FIG. 10) in cartridge 138. A screw 159 (see FIG. 11), accessible from the upper surface of section 126 is adjustable to set the amount of spring force exerted on detent end 156.

Turning now to FIG. 10, there is shown a planar view of ferrule holding cartridge 138, which is an elongated cartridge sized to slidingly pass through slot 136 when the upper and lower sections 124, 126 of tool body 122 are in their assembled position. The cartridge 138 may be generally rectangular in cross-section and includes a generally rectangular aperture 160 passing from end-to-end. The aperture 160 is sized to accept the ferrules 20 in an upright position as shown in FIG. 10. The ferrules 20 are urged toward a dispensing location 162 by a coil spring 164 located in aperture 160. The end 166 of cartridge 138 is closed and provides a reaction surface for spring 164. In one embodiment, the opposite end 168 is a loading end for ferrules 20 and for insertion of spring 164. A push block 170 fits slidingly in aperture 160 for interfacing between ferrules 20 and spring 164. A retainer 172 comprising a U-shaped insert is pushed into aperture end 168 after loading of a preselected number of ferrules 20 for retaining the ferrules in the cartridge 138. In a preferred embodiment, the end 168 is closed and the ferrules 20 are loaded from end 166. The spring 164 is then inserted and a locking retainer corresponding to retainer 172 is inserted in end 166.

The cartridge 138 includes the groove 158 in an upper surface near end 168. Between groove 158 and end 168, a hole 174 is formed through both the upper and lower surfaces of the cartridge. The hole 174 is slightly larger than the outside diameter of a one of the ferrules 20 and is so positioned that it aligns with the aperture 21 in tool nosepiece 22 when nosepiece 22 is inserted into slot 128 and detent end 156 is seated in groove 158. In such position, hole 174 also aligns with the end 144 of actuator 142.

FIGS. 11 and 11A are respective, cross-sectional views taken longitudinally and laterally of tool 120 with cartridge 138 in a ferrule dispensing position. The upper and lower sections 124, 126 of tool body 122 are held together by screws 176. The detent end 156 is seated in groove 158 in cartridge 138. The actuator end 144 is positioned in alignment with hole 174 and directly over one of the ferrules 20. When a tool nosepiece 22 is inserted in slot 128, it pushes the block 130 from below hole 174 allowing a ferrule to be dispensed by depressing actuator 142. With a ferrule 21 positioned in aperture 21, it effectively blocks hole 174 preventing any additional ferrules 20 from being dispensed. Removal of the nosepiece 22 allows the block 130 to return to a position blocking hole 174 to prevent ferrules from being dispensed.

Another embodiment of a cable tensioning, clamping and severing tool 180 is shown in FIGS. 12–17. FIG. 12 is a plan view of tool 180 showing a nosepiece 182 substantially identical to nosepiece 22 of tool 10. Phantom lines 184 represent an aperture through the nosepiece while phantom lines 186 represent a plunger corresponding to plunger mechanism 74 of tool 10. Tool 180 includes an upper handle part 188, formed from spaced plates 188a and 188b, and a lower pivoting handle part 190, formed of spaced plate 190a and 190b. A toggle assembly 192 is positioned between plates 188a and 188b and connected between handle part 190 and plunger 186 for actuating the plunger. A tensioning mechanism 194 is mounted to an outer surface of handle plate 188a and coupled to handle part 190 for tensioning a cable, such as cable 12, passing through aperture 196 in nosepiece 182.

Referring to FIG. 13, there is shown a cross-sectional view of tool 180 taken along line 13—13 of FIG. 12. The handle part 190b is formed with a generally L-shape with the longer arm of the L forming a hand grip and an end of the shorter arm being pivotably attached to plate 188a and 188b via a pin 198. A clutch link 200 is also pivotably attached to pin 198 and has a first end coupled to handle part 190 via a tension spring 202. Spring 202 has one end connected to handle part 190 by a pin 204 and another end connected to clutch link 200 by a pin 206. Clutch link 200 also includes a pin 208 extending transversely from a second end thereof and passing through a slot 210 in plate 188a for connecting the clutch link in driving relationship with tensioning mechanism 194. With the pin 198 positioned intermediate the first and second ends of link 200, the spring 202 tensions link 200 to track movement of handle part 190 so long as the force on pin 208 does not exceed the spring force.

Toggle assembly 192 includes a first link 210, a second link 212 and a third link 214. Link 210 has a first end pivotably attached to handle part 188 by a pin 216 and has a second end pivotably attached to a first end of link 212 by a pin 218. A second end of link 212 is pivotably attached to an end of a plunger mechanism 220 via pin 222. Link 214 is also pivotably coupled to pin 218 at a first end and has a second end coupled to handle part 190 via a pin 224 which pin 224 is movably in slot 226 in part 190. A tension spring 228 extends between pin 216 and link 214 for urging link 214 in a direction to straighten links 210 and 212 so as to push plunger mechanism 220 forward and exert a force on a ferrule 20 held in the aperture 196 in nosepiece 182. The spring 228 is selected to provide sufficient force to hold the ferrule without crimping while a cable passing through the ferrule is being tensioned. The pin 224 slides within slot 226 so long as cable tension is less than a preselected value determined by spring 202. While the cable is being tensioned, the handle part 190 may be repetitively squeezed toward handle part 188. A return spring 230 acting between pins 216 and 204 returns the handle part 190 to its open position.

The plunger mechanism 220 includes the rod shaped plunger 186, sometimes referred to as an indenter, having an enlarged head portion 232 and a lateral groove 234. The plunger 186 is inserted into the nosepiece 182 prior to attachment of the nosepiece to the tool 180 by screws 236. A pin 238 is inserted laterally through nosepiece 182 and through groove 234 to retain plunger 186 in nosepiece 182. A coil spring 240 encircles head portion 232 with one end attached to portion 232 and the other end reacting against nosepiece 182 to urge plunger 186 into a retracted position. The end of portion 232 abuts against a threaded insert 242 which threads into link member 244, which member 244 attaches to link 212 at pin 222. The insert 242 can be threaded in and out of member 244 to adjust the position of plunger 186 to compensate for wear or manufacturing tolerance.

Figure 14:
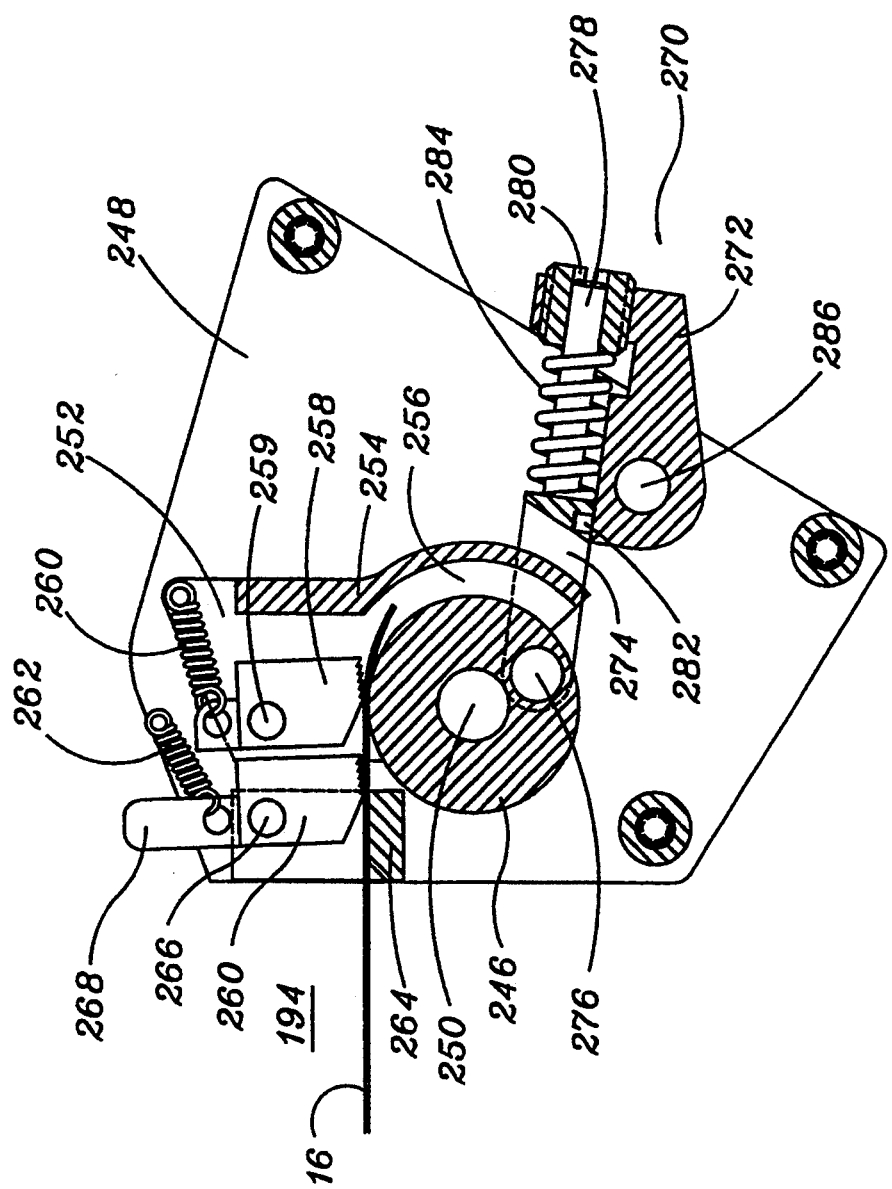
FIG. 14 is a cross-sectional view of the tool of FIG. 12 taken along the line 4—14.

Referring to FIG. 14, which is a cross-sectional view taken along line 14—14 of FIG. 12, the cable tensioning mechanism 194 includes a rotatable wheel 246 rotatably attached to plate 188a and outer cover plate 248 via a central pin or axle 250. The wheel 246 is captured between a pair of cover plates, one plate 252 being shown in FIG. 14. The plate 252 includes an edge strip 254 which defines a guide channel 256 for directing the cable about wheel 246. A pivoting pawl member 258 is coupled to plate 252 via pin 259. A tension spring 260 pulls against one end of member 258 urging the opposite end into engagement with wheel 246. When a cable is inserted from the left hand side as shown in FIG. 14, the cable is directed around wheel 246 through channel 256. The member 258 holds the cable against the wheel 246 preventing its release while the wheel is rotated in a clockwise (CW) direction. However, the wheel 246 can be rotated counterclockwise (CCW) and the member 258 will slip on the cable.

In order to restrain the cable when the wheel is rotated CCW, a second pawl member 260 is pivotably attached to plate 248. Member 260 is biased in the same direction as member 258 by another tension spring 262. Member 260 acts against a guide 264 and pivots about a pin 266. A cable can be inserted between member 260 and guide 264 and will follow a path about wheel 246. For ease of insertion, member 260 includes an outwardly extending lever 268 which allows manually pivoting of cam member 260 to open a path to wheel 246. The members 260 and 258 are positioned such that pivoting member 260 to open a path also pushes member 258 into an open position. This feature also allows removal of a cable in a reverse direction by releasing both members 258 and 260.

Rotation of wheel 246 is affected by pusher mechanism 270 which comprises an L-shaped member 272 and a forked connector 274. Connector 274 has a pair of spaced arms fitting against opposite surfaces of wheel 246 enabling connection to wheel 246 via a pin 276. Connector 274 also includes a rod 278, one end of which fits slidingly within an aperture 280 in one arm of member 272. Another pin 282 extends from member 272 and engages the fork end of connector 274. A compression spring 284 fits about rod 278 between the one arm of member 272 and the forked end of the connector 274 thus establishing a predetermined compressive loading between the relatively slidable member 272 and connector 274.

Figure 15:
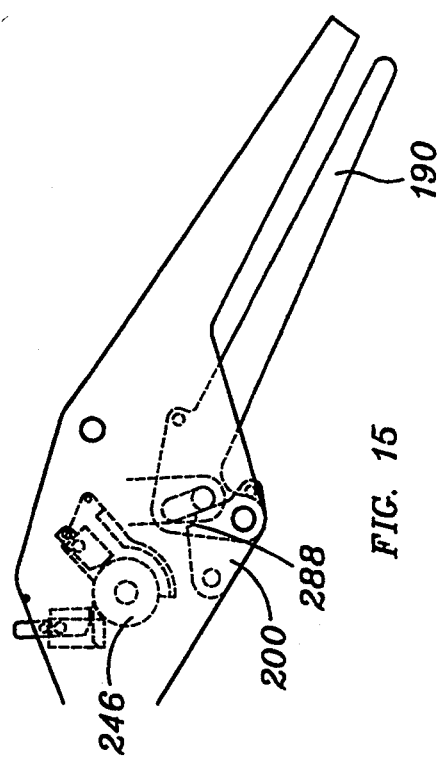
FIGS. 15-17 are simplified views of the operating mechanism of the tool of FIG. 12 in different stages of operation.
Figure 17:
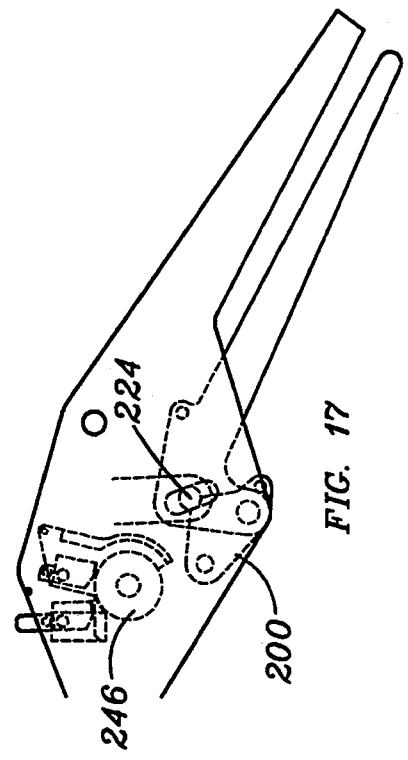
Figure 16:
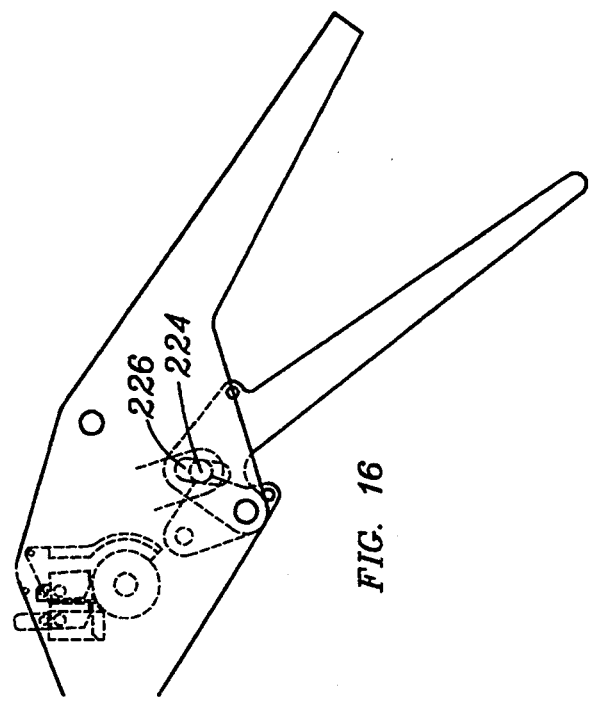

The member 272 includes an aperture 286 for receiving the pin 208 in clutch link 200. When handle part 190 is moved toward part 188, link 200 drives mechanism 270 in a direction to affect rotation of wheel 246. Referring to FIGS. 15, 16 and 17, the position of clutch link 200 and wheel 246 under loaded and unloaded conditions is shown to explain operation of the tool. In FIG. 15, the cable is being tightened and no significant tension has been pulled. The link 200 follows the handle 190, by virtue of spring 102, pushing mechanism 270 so as to affect rotation of wheel 246. On a stroke of handle part 190 in which tension on the cable exceeds the spring force of spring 202, the link 200 is restrained from following handle part 190 and a corner 288 of link 200 protrudes into alignment with slot 226 in which pin 224 slides as shown in FIG. 16. The corner 288 is inversely radiused to form a catch point for pin 224. With pin 224 stopped by link 200, the link 214 is driven in a direction to align links 210 and 212 thus driving plunger 186 into ferrule 20. As described with reference to tool 10, the plunger 186 simultaneously compresses ferrule 20 and severs the free end of the cable. FIG. 17 illustrates continued closure of handle part 190 with final tension drawn on the cable and crimping of the ferrule. Note that wheel 246 has rotated slightly from FIG. 16 as link 200 is driven to an end point. The final cable tension is set by spring 284 once link 200 is locked into engagement with pin 224. Final tensioning and ferrule crimping occur during the movement of handle part 190 from the position in FIG. 16 to that in FIG. 17. Note also that the spring 284 absorbs the movement of the link 200 without exceeding the predetermined cable tension as set by spring 284.

While the invention has been described in what is presently considered to be a preferred embodiment, various modifications will become apparent to those skilled in the art. It is intended that the invention not be limited to the disclosed embodiment but be interpreted within the spirit and scope of the appended claims.

What is claimed is:

1. A tool for tensioning safety cable to a mechanically set predetermined tension limit and for automatically terminating the cable when the predetermined limit is reached, the tool comprising:
   rotatable means mounted for reciprocating rotation about a point on the tool for incrementally advancing the cable during a drive stroke;
   a linkage assembly operatively connected to said rotatable means for affecting reciprocal rotating motion thereof;
   tension setting means operatively coupled to said linkage assembly for inhibiting rotation of the rotatable means when tension on the cable is greater than a mechanically set value; and
   clamping means operative automatically in response to inhibited rotation of the rotatable means for terminating the cable.

2. The tool of claim 1 wherein a deformable ferrule is held in the tool and the cable passes through the ferrule to said rotatable means, said clamping means comprising means for compressing the ferrule onto the cable.

3. The tool of claim 2 and including means operative concurrently with said clamping means for severing the cable adjacent the ferrule.

4. The tool of claim 1 and including a lever pivotably mounted to the tool, said lever being operatively coupled to said linkage means for incrementally rotating said rotatable means in response to pivotable and reciprocal motion of said lever.

5. The tool of claim 2 and including an elongated nosepiece extending from an end of the tool, a distal end of said nosepiece having an aperture passing therethrough generally transverse to the elongate direction of said nosepiece for passage of the cable, an entrance side of said aperture being sufficiently large to receive said ferrule and an exit side of said aperture being sized to pass the cable while blocking said ferrule, and a plunger mounted within said nosepiece for motion transverse to said aperture, said plunger being operatively coupled to said linkage assembly for compressing said ferrule onto the cable when rotation of said rotatable means is inhibited by tension of the cable to the preselected value.

6. The tool of claim 5 wherein said plunger displaces an edge of said ferrule against said exit side of said aperture for shearing the cable against said exit side of said aperture.

7. The tool of claim 5 and including a housing for containing at least said linkage assembly and said tension setting means, said linkage assembly comprising:
   a clutch link having a first end and a second end, said link having a mounting point intermediate said ends for pivotably mounting said link to said lever and a tension spring extending between said first end of said link and a connecting point on said lever for biasing said link in a first direction;
   a first link and a second link pivotably joined at respective first ends thereof, a second end of said first link being pivotably mounted to the housing and a second end of said second link being pivotably mounted to an end of said plunger; and
   a third link extending between said lever and said first ends of said first and second links, actuation of said third link being effective to urge said first and second links towards a generally in-line position for displacing said plunger; and
   means on said clutch link for engaging said third link when tension on said cable is within a predetermined range of said preselected tension value.

8. The tool of claim 7 and including a drive mechanism extending between said second end of said clutch link and said rotatable means, said drive mechanism forcing a rotating motion of said rotatable means in response to pivoting motion of said clutch link, said drive mechanism including first and second members interconnected by a compression spring for absorbing motion of said clutch link without rotation of said rotatable means.

9. The tool of claim 7 wherein said rotatable means comprises:
   first means for grasping the cable when said rotatable means rotates in a first direction to tension the cable and for sliding on the cable when said rotatable means rotates in a second direction;
   second means for restraining the cable when said rotatable means rotates in said second direction.

10. A tool for tensioning safety cable to a mechanically set tension limit and for automatically terminating the cable when the cable has been tensioned to the mechanically set limit, the tool including means for grasping and pulling the cable to the tension limit and means for automatically crimping a ferrule onto the cable when the tension limit is reached, said means for crimping being operative to sever a free end of the cable concurrently with crimping of the ferrule.

* * * * *